United States Patent
Rondahl

(10) Patent No.: US 7,866,411 B2
(45) Date of Patent: Jan. 11, 2011

(54) VIBRATION DAMPENED HAND-HELD POWER TOOL

(75) Inventor: Erik Rondahl, Åkersberga (SE)

(73) Assignee: Dentatus AB, Hagersten (SE)

( * ) Notice: Subject to any disclaimer, the term of this patent is extended or adjusted under 35 U.S.C. 154(b) by 97 days.

(21) Appl. No.: 12/097,880

(22) PCT Filed: Nov. 29, 2006

(86) PCT No.: PCT/SE2006/050520

§ 371 (c)(1),
(2), (4) Date: Jun. 18, 2008

(87) PCT Pub. No.: WO2007/073323

PCT Pub. Date: Jun. 28, 2007

(65) Prior Publication Data

US 2008/0314609 A1    Dec. 25, 2008

Related U.S. Application Data

(60) Provisional application No. 60/597,791, filed on Dec. 20, 2005.

(30) Foreign Application Priority Data

Dec. 20, 2005 (SE) .................................. 0502838-6

(51) Int. Cl.
*B25D 17/00* (2006.01)
(52) U.S. Cl. ........................ 173/49; 173/122; 173/162.2
(58) Field of Classification Search .................... 173/49, 173/112, 114, 115, 122, 205, 162.1, 162.2; 451/340, 344, 357
See application file for complete search history.

(56) References Cited

U.S. PATENT DOCUMENTS 1,932,259 A * 10/1933 Warren ........................ 173/205

(Continued)

FOREIGN PATENT DOCUMENTS

DE        29820692 U1    4/1999

OTHER PUBLICATIONS

DataBase WPI Week 198436 Derwent Publications Ltd., Lond GB, Class P54, AN 1984-223960 & SU 1065107 A (Gerasimov B I), Jan. 7, 1984.

(Continued)

*Primary Examiner*—Paul R Durand
(74) *Attorney, Agent, or Firm*—Pearne & Gordon LLP

(57) ABSTRACT

A hand-held power tool, e.g. a high speed file or polisher has a single rotary drive shaft (8) to which there is locked a first eccentric member (1) in which a second eccentric member (2) can be rotated and locked forming a first assembly (10). The second eccentric member has an eccentrically placed crank pin in the form of a hollow needle bearing ring (2*a*) through which the drive shaft passes. The outer ring (7) of the needle bearing reciprocally drives a connecting rod (1.2) to a tool holder (9). The drive shaft also passes through an identical assembly (10*f*) of first and second eccentric members (1', 2') disposed upside down on the first assembly (10) and reciprocally driving, in the opposite direction and in counterphase, a counterweight, to cancel the reactive oscillating forces from the tool holder during operation, which would otherwise have to be absorbed by the hand and aim of the operator. Relative rotational adjustment of the first (1, 1') and second (2, 2') eccentric members simply changes the length of stroke of the tool holder and the counterweight, respectively,

8 Claims, 4 Drawing Sheets

U.S. PATENT DOCUMENTS

Figure 1:
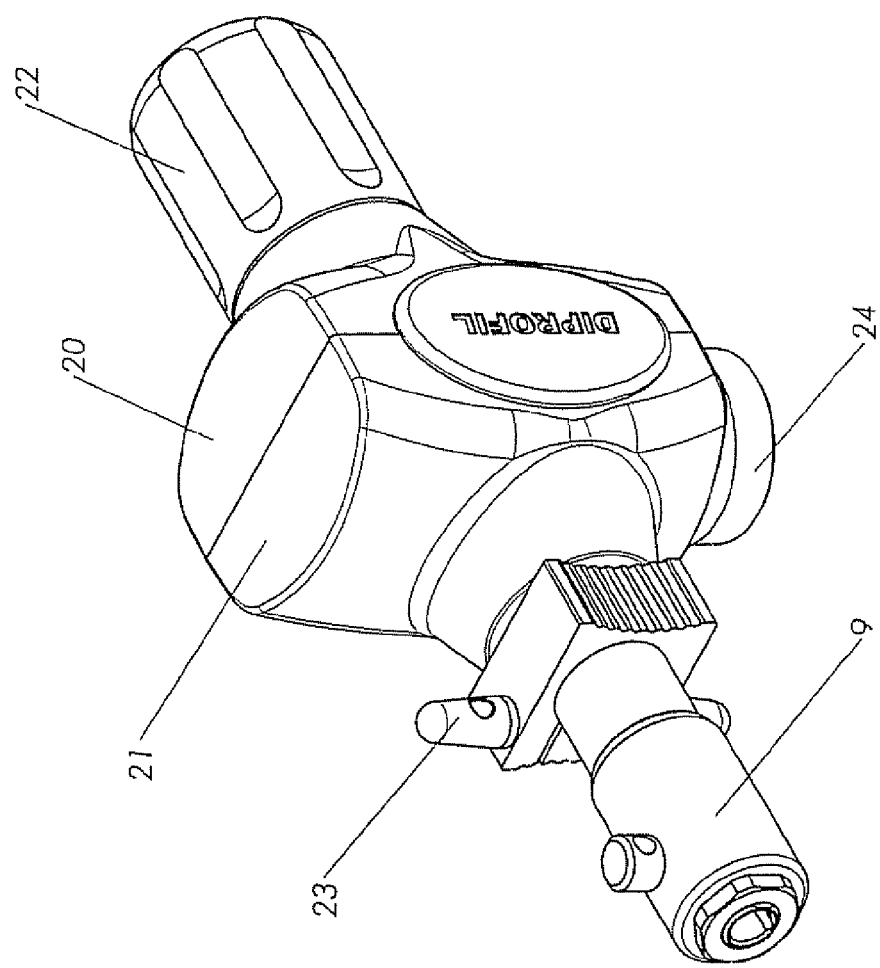

| | | | | |
|---|---|---|---|---|
| 4,593,579 A | * | 6/1986 | Oszut | 74/570.21 |
| 5,212,995 A | * | 5/1993 | Robinson et al. | 74/44 |
| 5,609,515 A | * | 3/1997 | Takach | 451/344 |
| 6,357,125 B1 | * | 3/2002 | Feldmann et al. | 30/392 |
| 6,658,745 B1 | * | 12/2003 | Huang | 30/392 |
| 7,191,847 B2 | * | 3/2007 | Haas | 173/114 |

OTHER PUBLICATIONS

DataBase WPI Week 198409 Derwent Publications Ltd., London, GB; Class Q62, AN 1984-054711 & SU 1013641 A (AS UKR Phy Mech Inst), Apr. 23, 1983.

* cited by examiner

VIBRATION DAMPENED HAND-HELD POWER TOOL

CROSS REFERENCE TO RELATED APPLICATIONS

This application is a national stage application of International Application PCT/SE2006/050520, filed 29 Nov. 2006, designating the United States of America, which claims the benefit of Swedish application No. 0502838-6 filed on 20 Dec. 2005 and U.S. provisional application No. 60/597791 filed on 20 Dec. 2005.

FIELD OF THE INVENTION

The present invention relates to a hand-held power tool effecting a reciprocation movement as recited in the preamble to Claim 1.

BACKGROUND

Pneumatic, hydraulic and electric hand-held power tools are used in thousands of different work areas. Tools which translate the rotation of a rotary driving motor to a reciprocating lateral movement, for sawing, filing and polishing for example, often give rise to considerable vibration, which can be transmitted to the hand and arm of the person using the tool.

Prolonged use of vibrating tools can cause changes in tendons, muscles, bones and joints, and can affect the nervous system. Collectively, these effects are known as Hand-Arm Vibration Syndrome (HAVS). The symptoms of VWF are aggravated when the hands are exposed to cold.

Workers affected by HAVS commonly report: attacks of whitening (blanching) of one or more fingers when exposed to cold, tingling and loss of sensation in the fingers, loss of light touch, pain and cold sensations between periodic white finger attacks, and loss of grip strength, as well as bone cysts in fingers and wrists in some cases.

The development of HAVS is gradual and increases in severity over time. It may take a few months to several years for the symptoms of HAVS to become noticeable. As scientific confirmation of these delayed effects has been forthcoming, attempts to avoid these debilitating effects have been given increasing emphasis over the past few decades.

In addition to the use of anti-vibration gloves, limitations on maximum hours of exposure to vibration and use of sharper cutting tools, stricter requirements have been placed on vibration levels generated by hand-held power tools, measured in frequency weighted acceleration ($m/s^2$). The standard developed by the American Conference of Government Industrial Hygienists (ACGIH) prescribes a maximum of 4 $m/s^2$ for 8 hour use. The European Directive 2002/44/EC mandates an upper absolute limit of 5 $m/s^2$ for an 8 hour period.

The hand-held power tool industry has been under significant pressure for some time now to develop tools which can generate sufficient reciprocating linear active force for sawing and filing for example without the reactive forces being transmitted to the hand holding the tool.

BACKGROUND ART

A hand-held power tool is described in SE 134 791, which translates a rotary movement generated by an electric motor into a reciprocating linear movement. An eccenter assembly comprises a first member securely mounted on said drive shaft and having a circular cavity eccentric to said drive shaft and a second member fitting into said circular cavity. For linear reciprocating movement the tool holder is connected in a conventional manner via a connecting rod to a rod bearing on the circular second member at a location displaced from the center axis of the second member. By rotating the circular second member within the first member the two eccentricities can either be added, providing the maximum stroke, or, by rotating the second member 180° in the first member, from the maximum stroke position, a configuration is achieved where the connecting rod bearing is at the axis of rotation of the first member thereby providing a linear stroke of zero. By turning the second member in the first member all stroke lengths up to the maximum can be achieved. When the desired stroke length is set, tightening a set screw locks the first and second members together.

Since the first and second members are made of the same material and form together, regardless of the relative setting of the second member, a circular unit centered on the rotary axis, this rotating unit will always be balanced in itself. However the reactive forces produced by the linear reciprocating movement of the tool will not be balanced however and must be absorbed by the hand and arm of the user.

Various complicated mechanisms have been proposed to damp these reactive forces in similar reciprocating hand-held power tools such as the saw described in US20050022395A1. In this saw, rotary motion from an electric motor is translated into reciprocal linear motion of a saw blade via a rotating crank wheel and a blade driving crank pin eccentrically disposed on the crank wheel. To attempt to balance out vibrational forces, there is another crank pin on the rotating crank wheel moving a counterweight back and forth. As mentioned in the description of US20050022395A1, the counterweight is of fixed weight and the dwell angle for the oscillating movement of the counterweight is permanently set at a standard estimated value for a standard resistance generated when sawing through standard materials. There is no way to adjust the length of stroke of the saw blade, which would require an adjustment of the reciprocal movement of the counterweight to achieve cancellation of the vibrations.

This design is thus permanently set and makes impossible any stroke length adjustment or adjustment of the counterweight movement.

SUMMARY OF THE INVENTION

The problem addressed by the present invention is to construct a reciprocating hand-held power tool, which is robust, compact and simple in its mechanisms both for working and vibration compensation, and which also provides for easy tool stroke length adjustment without compromising full cancellation of vibrations.

This power tool should be suitable for high speed oscillation and withstand long term continuous use without significant decrease in vibration cancellation.

This is achieved in a reciprocating hand-held power tool of the type described by way of introduction which has the features disclosed in the characterizing clause of Claim 1.

According to a further advantageous embodiment of the invention the first and second eccenter assemblies are comprised of identical parts, thereby reducing production and repair costs.

Further advantageous embodiments of the present invention are disclosed in the dependent claims.

DETAILED DESCRIPTION

Figure 2:
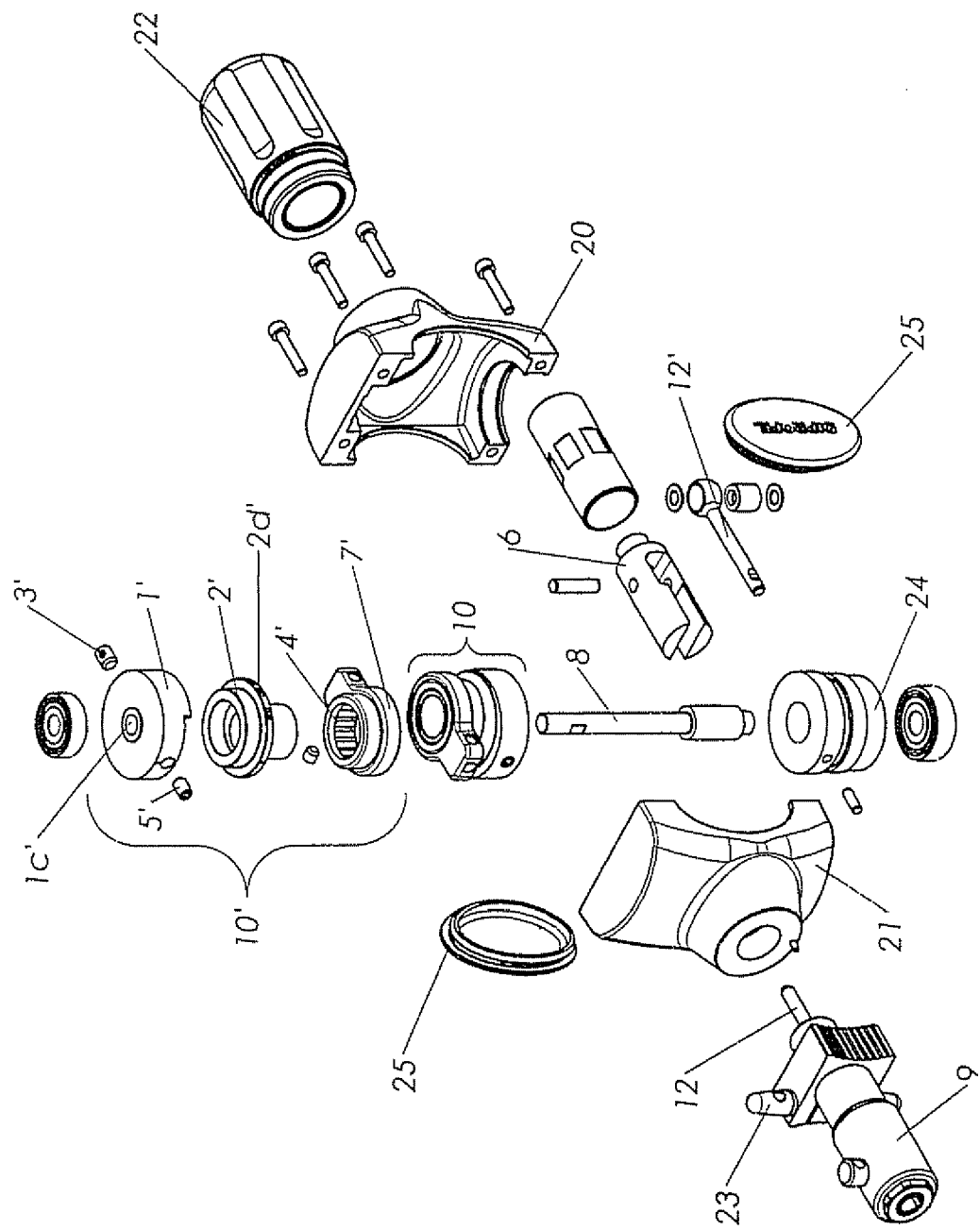
Figure 3:
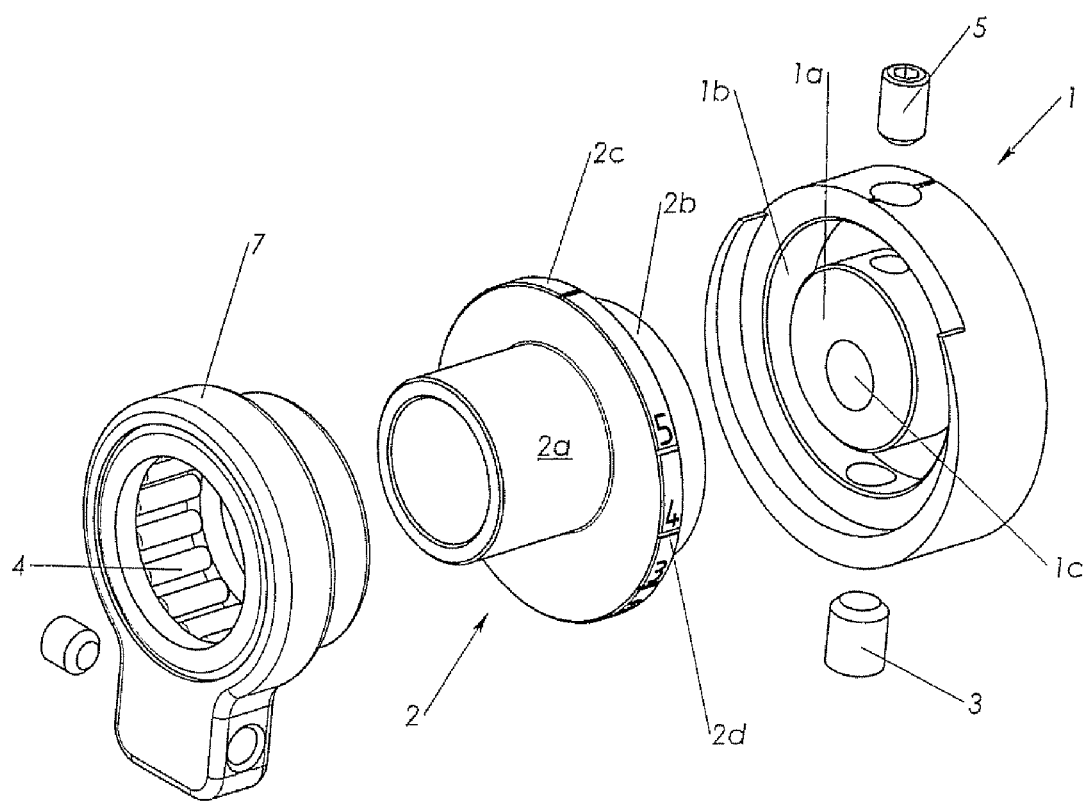
Figure 4:
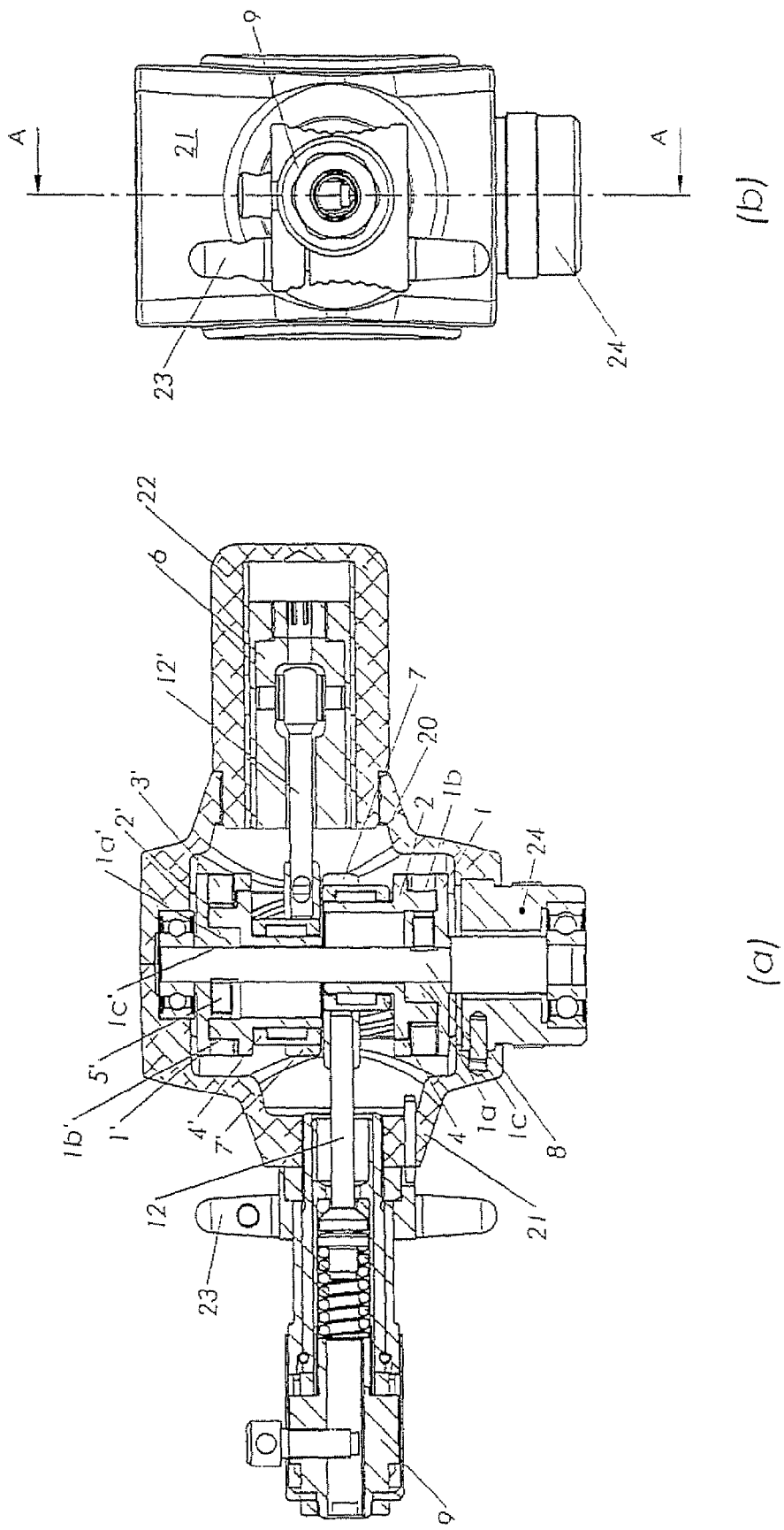

The invention will now be illustrated with reference to a non-limiting preferred embodiment, shown in the accompanying drawings of which:

FIG. 1 shows in perspective a hand-held reciprocating power tool according to the invention, FIG. 2 shows an exploded view of the power tool shown in FIG. 1, FIG. 3 is an exploded view of the parts of the first eccenter assembly, and FIG. 4(a) shows a longitudinal section through the same power tool along the center plane A-A in FIG. 4(b) showing an end view of the power tool.

FIG. 1 shows the handheld reciprocating power tool according to the present invention, having a housing 21,22 a cylindrical counterweight cover 22 as well as a tool holder 9 for securely holding a file or polishing tool for reciprocating movement. The angle of the tool can be adjusted about its longitudinal axis using an adjuster 23 during actual filing or polishing. The tool is coupled to motor driven flexible rotating shaft via a coupling 24.

FIG. 2 shows the same hand-held reciprocating power tool in an exploded view revealing a rotary shaft 8 on which there are fixed both a first eccenter assembly (unexploded) 10 for imparting linear reciprocating movement to the tool holder 9 and a second eccenter assembly 10' (exploded) for imparting linear reciprocating movement to a counterweight 6. Both the first and second eccenter assemblies 10, 10' are each made up of identical parts (see also FIGS. 3 and 4): a circular distal member 1, 1' having a centered hole 1c, 1c' through which the rotary shaft 8 passes. Each circular distal member is securely locked for rotation to the rotary shaft 8 by means of a lock screw 5, 5'. Each distal member 1, 1' is circular and centered about the shaft 8 but has inside a circular groove 1b, 1b' which is displaced eccentrically from the rotary shaft 8. Into this circular groove a cylindrical portion 2b, 2b' of a proximal member fits. This proximal member has on its other side a needle roller bearing ring 2a, 2a' which is displaced eccentrically in relation to the center of the circular cylindrical portion 2b, 2b' of the proximal member. A ring 7, 7' is the outer ring of the needle roller bearing 4, 4' and has an attachment means for a connecting rod 12, 12' leading either to the tool holder 9 or to the counterweight 6 for imparting reciprocating motion thereto.

The two eccenter assemblies 10, 10' are placed upside down in relation to each other and the same drive shaft 8 passes through them, providing an extremely robust and simple construction. The proximal (second) members (2,2') are adjacent each other thereby reducing the reactive force couple generated by them to a minimum. The fact that the two eccenter assemblies are made of identical parts makes it very simple to balance them to each other, in addition to the cost savings for manufacture and spare parts.

As can be most clearly seen in FIG. 4(a), by unscrewing the screw 3 and rotating the proximal member in the groove in the distal member the eccentricities of the circular groove 1b, 1b' and of the needle bearing ring 2a, 2a' can either be gradually compounded, ultimately resulting in a maximum stroke length for the connecting rod 12, 12' or subtracted from each other ultimately resulting in the eccentricities completely cancelling each other and resulting in a stroke length of essentially zero. The counterweight is mounted on a connecting rod (12') driven by the crank pin of said second eccenter assembly (10') and is interchangeable to counterbalance different tools.

The numbered scale 2d, 2d' on the rim of the proximal member 2, 2' is used to determine the compound eccentricity from zero stroke to a maximum of 5 mm. It is easy for the user to set the stroke for the counterweight at exactly the same value as for the tool holder stroke. This can be easily checked by removing the covers 25.

The invention claimed is:

1. Handheld power tool effecting a reciprocating movement, comprising:
    a reciprocating tool holder,
    a rotary shaft,
    a first eccenter assembly fixed to said rotary shaft and translating rotary movement of the shaft into reciprocating linear movement of said tool holder,
    a counterweight counteracting reactive forces generated by the tool holder, further comprising:
    a second eccenter assembly also fixed to said rotary shaft and translating rotary movement of the shaft into reciprocating linear movement of said counterweight diametrically opposite to and in phase with the reciprocating linear movement of the tool holder,
    each of said first and second eccenter assemblies comprising a first member securely mounted on said drive shaft and having a circular part eccentric to said drive shaft and a second member, which is rotatably adjustable and lockable relative to said circular part and which has an off-center crank pin imparting reciprocating linear movement as said drive shaft rotates, wherein said counterweight is mounted on a connecting rod driven by the crank pin of said second eccenter assembly and is interchangeable to counterbalance different tools.

2. Handheld power tool according to claim 1, wherein said power tool is a high speed file or polisher.

3. Handheld power tool according to claim 1, wherein said off-center crank pin is a hollow cylindrical bearing journal through the interior of which said drive shaft passes.

4. Handheld power tool according to claim 3, wherein said first and second eccenter assemblies comprise identical parts.

5. Handheld power tool according to claim 3, wherein said second eccenter assembly is mounted upside-down in relation to said first eccenter assembly with said second members being proximate each other and said first members being distant from each other.

6. Handheld power tool according to claim 3, wherein said hollow cylindrical bearing journal is the inner ring of a roller needle bearing, the outer ring of which is joined to a connecting rod for reciprocal motion of the tool holder or the counterweight respectively.

7. Handheld power tool effecting a reciprocating movement, comprising:
    a reciprocating tool holder,
    a rotary shaft,
    a first eccenter assembly fixed to said rotary shaft and translating rotary movement of the shaft into reciprocating linear movement of said tool holder,
    a counterweight counteracting reactive forces generated by the tool holder, further comprising:
    a second eccenter assembly also fixed to said rotary shaft and translating rotary movement of the shaft into reciprocating linear movement of said counterweight diametrically opposite to and in phase with the reciprocating linear movement of the tool holder,
    each of said first and second eccenter assemblies comprising a first member securely mounted on said drive shaft and having a circular part eccentric to said drive shaft and a second member, which is rotatably adjustable and lockable relative to said circular part and which has an off-center crank pin imparting reciprocating linear movement as said drive shaft rotates, wherein said off-center crank pin is a hollow cylindrical bearing journal through the interior of which said drive shaft passes and each eccenter assembly is provided with a peripheral scale indicating the exact position of the first member relative to the second member and thus the length of stroke of reciprocal movement.

8. Handheld power tool according to claim 7, wherein the length of stroke can be adjusted between 0 and 5 mm.

* * * * *